(No Model.)
F. P. HINDS.
NUT LOCK WASHER.
No. 533,895. Patented Feb. 12, 1895.
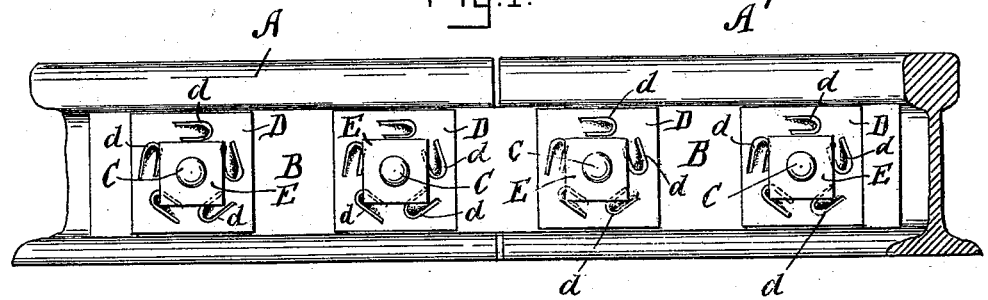
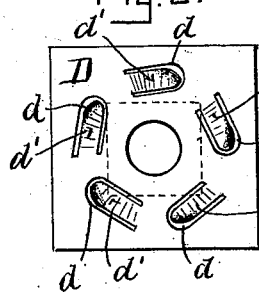
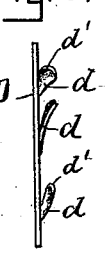
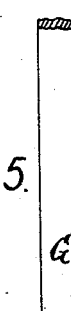
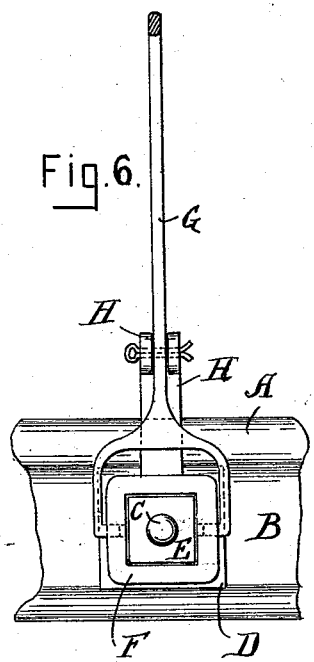
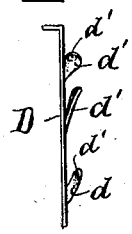
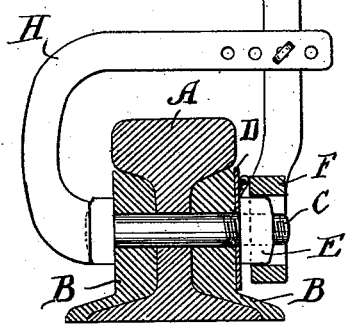
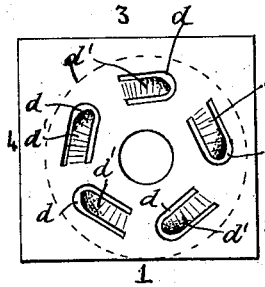
Witnesses.
Inventor.
Franklin P. Hinds
by Edwin Plank
Attorney.

UNITED STATES PATENT OFFICE.

FRANKLIN P. HINDS, OF BOSTON, ASSIGNOR OF TWO-THIRDS TO WALTER L. EMERY AND EVERET F. PACKARD, OF BROCKTON, AND WILLIAM H. EMERY, OF BROOKLINE, MASSACHUSETTS.

NUT-LOCK WASHER.

SPECIFICATION forming part of Letters Patent No. 533,895, dated February 12, 1895.

Application filed December 23, 1893. Serial No. 494,550. (No model.)

*To all whom it may concern:*

Be it known that I, FRANKLIN P. HINDS, a citizen of the United States, and a resident of Boston, in the county of Suffolk and State of Massachusetts, have invented certain new and useful Improvements in Nut-Lock Washers, of which the following, taken in connection with the accompanying drawings, is a specification.

The object of my invention is to produce a washer for locking nuts of bolts so that they cannot turn to become loose, and is specially applicable for securing the nuts of bolts of railroad fish plates, carriages, and any place where the nuts are liable to become loosened by a constant jar.

The invention consists of a thin piece of metal preferably steel, having a number of horse shoe shaped slots cut therein the tongue formed thereby being bent up to form a spring that holds the nut in place.

Referring to the accompanying drawings: Figure 1— represents a side view of a portion of two railroad rails connected together by a fish plate the nuts of the bolts being held by washers embodying my invention. Fig. 2— is a front view of one of the washers. Fig. 3— is a side view of the same. Fig. 4— is a side view of a washer with a turned over edge. Fig. 5— is a transverse section showing a lever for compressing the tongues to release the nuts. Fig. 6— is a front view of the same. Fig. 7— is a front view of a round washer embodying my invention and adapted for wood work. Fig. 8— is a side view of same. Fig. 9— is a view of a washer the sides of which are at a varying distance from the center of the bolt hole.

A, A', represent two railroad rails connected together by fish plates B, through which are passed bolts C.

D, is a washer that is placed upon the bolt C, between the fish plate and the nut E. This washer is preferably formed of sheet steel and has a number of horse shoe shaped slots $d$, cut therein. The tongues $d'$, which are thus formed are then bent outward to form a projecting spring piece one of which comes into contact with one of the sides of the nut E, and holds it so that it cannot turn, the washer D, itself being held by its lower side resting upon the flange of the fish plate B, or rail A. The outer edge of each of the ends of the tongues $d'$, are bent up as shown so that when it is desired to release the nut E, the spanner is first pressed against the said bent up portion so that the tongue $d'$, is depressed on a level with the face of the washer D, and the nut E, is free to be turned, the said turned up portion being beyond the radius of the corners of the nut so that the nut will not come into contact therewith.

To release the nuts I prefer to employ a spanner or lever as shown in Figs. 5 and 6 consisting of a hollow square boss F, of a size to fit over the nut E, to which boss is fulcrumed a forked upright lever G. To this lever G, is pivoted an armed lever H, the lower end of which fits over the head of the nut and holds it in place. Now by pressing the lever outward from the rail the boss F, is pressed inward and bears upon the projections of the tongues $d'$, thus forcing the tongues down to or on about a level with the face of the washer D, thus releasing their hold upon the nut so that by turning the lever the nut will be screwed off the bolt.

In Fig. 4 I have shown a washer with its upper edge bent over so as to rest upon the top of the fish plate to hold it in place.

In Figs. 7 and 8 I have shown a washer adapted for use on wood work. In this case the washer is punched out between the tongue to form spurs G, which are pressed into the wood to hold the washer in place.

I prefer to have the edges of the washer at varying distances from the center of the bolt hole as shown in Fig. 9, so as to adapt it to various sizes of fish plates or rails. It will be seen that the side 1, is nearest to the bolt hole, the side 2, a little farther away, the side 3, a greater distance, and side 4, still a greater distance than side 3, so that the washer can be turned to have its lower edge resting upon the flange of the fish plate or rail according to the distance the bolt is from the same.

It will be seen that by the employment of a washer thus constructed when the nut is screwed on its corner will easily depress tongues $d'$, and when the corner of the nut has passed over a tongue the latter will immediately spring up and prevent the nut from being turned in the opposite direction until the said tongues have been again depressed as before described.

Although I have shown in the drawings washers with five tongues it is obvious that more or less might be employed as may be desired, and the same may be said of the spurs shown in Figs. 7 and 8.

What I claim is—

A nut lock washer consisting of a plate of metal having a central bolt hole and a series of spring tongues projecting from one side thereof, said tongues being arranged substantially equi-distant from each other around the hole and each having its inner edge straight and tangential to a circle concentric with the hole, the tongues being formed with a different angularity between each pair whereby the different edges of the nut are adapted to be engaged by the different tongues and locked at small intervals of rotation, substantially as set forth.

In testimony whereof I have signed my name to this specification, in the presence of two subscribing witnesses, on this 20th day of November, A. D. 1893.

FRANKLIN P. HINDS.

Witnesses:
CHAS. STEERE,
EDWIN PLANTA.